United States Patent
Jung

(10) Patent No.: US 6,337,528 B1
(45) Date of Patent: Jan. 8, 2002

(54) ROLLER WITH SELF-CONTAINED GENERATOR DEVICE

(75) Inventor: Wu-Chung Jung, No. 22, Cheng-I Rd., Lun-Pei Hsiang, Yun-Lin Hsien (TW)

(73) Assignee: Wu-Chung Jung (TW)

( * ) Notice: Subject to any disclaimer, the term of this patent is extended or adjusted under 35 U.S.C. 154(b) by 0 days.

(21) Appl. No.: 09/691,602

(22) Filed: Oct. 18, 2000

(30) Foreign Application Priority Data

Aug. 30, 2000 (TW) ......................................... 089215020

(51) Int. Cl.⁷ ............................................... H02K 17/42
(52) U.S. Cl. ..................... 310/168; 310/67 A; 310/75 C
(58) Field of Search .............................. 310/168, 67 A, 310/75 C, 254, 257, 258, 75 B

(56) References Cited

U.S. PATENT DOCUMENTS

| | | | | |
|---|---|---|---|---|
| 3,569,804 A | * | 3/1971 | Studer ......................... | 310/168 |
| 3,710,158 A | * | 1/1973 | Bachle et al. ................ | 310/156 |
| 4,096,624 A | * | 6/1978 | Gray et al. .................... | 29/596 |
| 4,786,834 A | * | 11/1988 | Grant et al. ................. | 310/194 |
| 5,115,159 A | * | 5/1992 | Takamiya et al. .......... | 310/67 A |
| 5,260,616 A | * | 11/1993 | Mizutani et al. ........... | 310/49 R |
| 5,828,145 A | * | 10/1998 | Nakamura ................. | 310/67 A |
| 6,118,196 A | * | 9/2000 | Cheng-Yon ................ | 310/75 C |

* cited by examiner

Primary Examiner—Nestor Ramirez
Assistant Examiner—Thanh Lani
(74) Attorney, Agent, or Firm—Morgan & Finnegan, LLP

(57) ABSTRACT

A roller is disposed rotatably on a roller shaft of a scooter, and has a housing which includes two housing halves that are interconnected to define an accommodation chamber therebetween. The housing halves define two shaft holes to permit extension of the roller shaft. A light-permeable rim element is sleeved fixedly on the housing. A light emitting unit is disposed within the rim element. An induction generator device is disposed within the accommodation chamber of the roller housing, and includes a mounting tube sleeved fixedly on the shaft, and a permanent magnet sleeved on the tube. A winding unit is disposed within the accommodating chamber, and includes a sheave and a coil unit that is wound on the sheave and that is in electrical connection with the light emitting unit. The sheave is sleeved rotatably on the magnet, and is fixed to the housing. Two ring-shaped conducting plates are mounted fixedly in the housing, and are in electrical and coaxial connection with the coil unit. Each of the conducting plates has an inner ring, an outer ring, and a plurality of elongated radially extending sheets which are angularly spaced apart from each other and which have radial inner ends integrally formed with the inner ring, and radial outer ends integrally formed with the outer ring.

4 Claims, 4 Drawing Sheets

ROLLER WITH SELF-CONTAINED GENERATOR DEVICE

BACKGROUND OF THE INVENTION

1. Field of the Invention

The invention relates to a roller, more particularly to a roller having a self-contained induction generator device.

2. Description of the Related Art

The improvement of this invention is directed to a conventional roller mounted rotatably on a roller shaft of a scooter. The roller is generally provided with a light emitting unit and a dry battery for supplying electricity to the light emitting unit. Since the dry battery needs to be replaced frequently, a roller with a self-contained generator device has been proposed, so as to eliminate the need to replace the dry battery in the conventional roller.

Referring to FIGS. 1 and 2, a conventional roller 1, which is adapted to be mounted rotatably on a horizontal roller shaft 16 of a scooter (not shown), is shown to include a roller housing 10, a light emitting unit in the form of two bulbs 14, and an induction generator device 13.

As illustrated, the roller housing 10 includes two housing halves 11 which are interconnected removably and which define an accommodation chamber 102 therebetween. The housing halves 11 are mounted rotatably on the shaft 16 by means of two bearing units 15. Each of the housing halves 11 has a shaft-extension hole 101 so that it is adapted to be sleeved rotatably on the shaft 16 in such a manner that the shaft 16 extends through the shaft-extension holes 101 in the housing halves 11. The bulbs 14 are mounted within the housing 10. One of the housing halves 11 is formed with a pair of diametrically disposed light passage holes 111 via which illumination from the bulbs 14 are visible from an exterior of the housing 10.

The induction generator device 13 is disposed within the accommodation chamber 102 of the housing 10, and includes a permanent magnet 135 that is sleeved securely on the shaft 16 and that has two opposite vertical side surfaces 131, and a winding unit consisting of a sheave 130 and a coil unit 132 that is wound on the sheave 130 and that is in electrical connection with the bulbs 14. The sheave 130 is sleeved rotatably on the magnet 131, and is further fixed to the housing 10. Two ring-shaped vertical electrically and magnetically conducting plates 133 are mounted fixedly in the housing 10 and are in electrical and coaxial connection with the coil unit 132. Each of the conducting plates 133 has a plurality of elongated axially extending sheets 134 which are angularly spaced apart from each other and which extend into an annular space defined between the magnet 131 and the sheave 130. Under this condition, when the roller 1 rotates about the shaft 16, electricity is generated on the coil unit 132 so as to intermittently light up the bulbs 14, thereby emitting a flashing light from the roller 1 via the light passage holes 111.

Because the sheets 134 are disposed around the shaft 16, magnetic lines of force passing through the sheets 134 are relatively few, thereby resulting in a limited induced electromotive force. In addition, the permanent magnet 135 is isotropic, and made from barium-based iron oxide powder. The number of magnetic lines of force generated therefrom is relatively small, thereby adversely affecting generation of electricity for illumination of the bulbs 14.

SUMMARY OF THE INVENTION

The object of the present invention is to provide a roller having a self-contained induction generator device of a unique structure which is capable of serving as a more effective electrical power source for lighting a light emitting unit disposed on the roller.

Accordingly, a roller of the present invention is adapted to be disposed rotatably on a horizontal roller shaft of a scooter. The roller includes a roller housing, a light-permeable rim element, a light emitting unit, and an induction generator device. The roller housing includes two housing halves, which are interconnected removably and which define an accommodation chamber therebetween. Each of the housing halves has a shaft hole adapted to be sleeved rotatably on the shaft in such a manner that the shaft extends through the shaft holes. The light-permeable rim element is sleeved fixedly on the housing. The light emitting unit is disposed within the rim element. The induction generator device is disposed within the accommodation chamber of the housing, and includes a mounting tube, a permanent magnet, a winding unit, and two ring-shaped vertical electrically and magnetically conducting plates. The mounting tube is adapted to be sleeved fixedly on the shaft. The permanent magnet is shaped as a vertical ring plate that is sleeved non-rotatably on the mounting tube and that has two opposite vertical side surfaces. The winding unit includes a sheave and a coil unit that is wound on the sheave and that is in electrical connection with the light emitting unit. The sheave is sleeved rotatably on the magnet, and is fixed to the housing. The conducting plates are mounted fixedly in the housing, and are in electrical and coaxial connection with the coil unit. Each of the conducting plates has an inner ring, an outer ring, and a plurality of elongated radially extending sheets which are angularly spaced apart from each other and which have radial inner ends that are formed integrally with the inner ring, and radial outer ends that are formed integrally with the outer ring. When the roller rotates about the shaft, electricity is generated on the coil unit so as to intermittently light up the light emitting unit, thereby emitting a flashing light from the roller via the rim element.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 3:
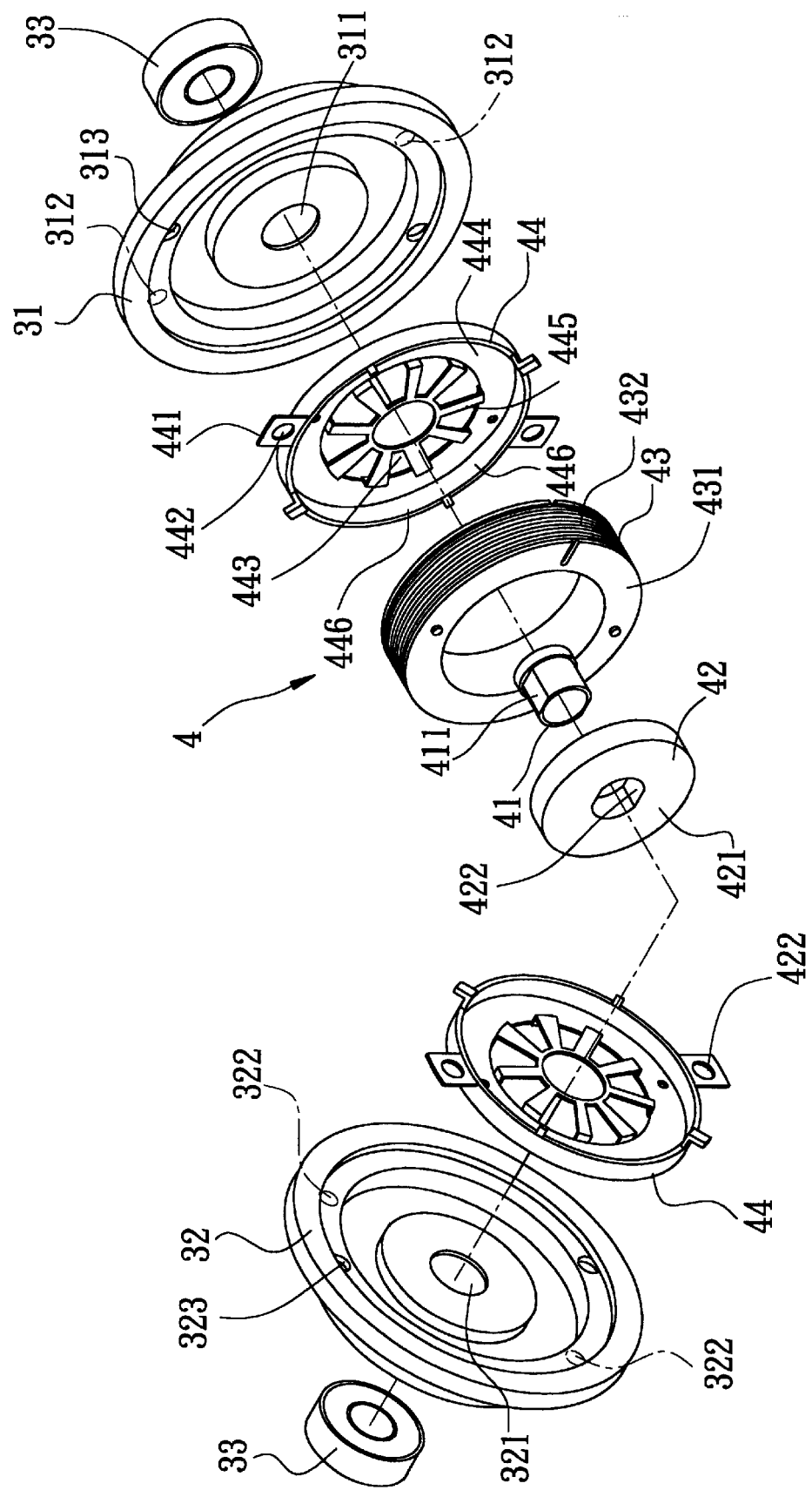
FIG. 3 is an exploded view of a preferred embodiment of a roller of the present invention which is adapted to be mounted rotatably on a roller shaft of a scooter.
Figure 4:
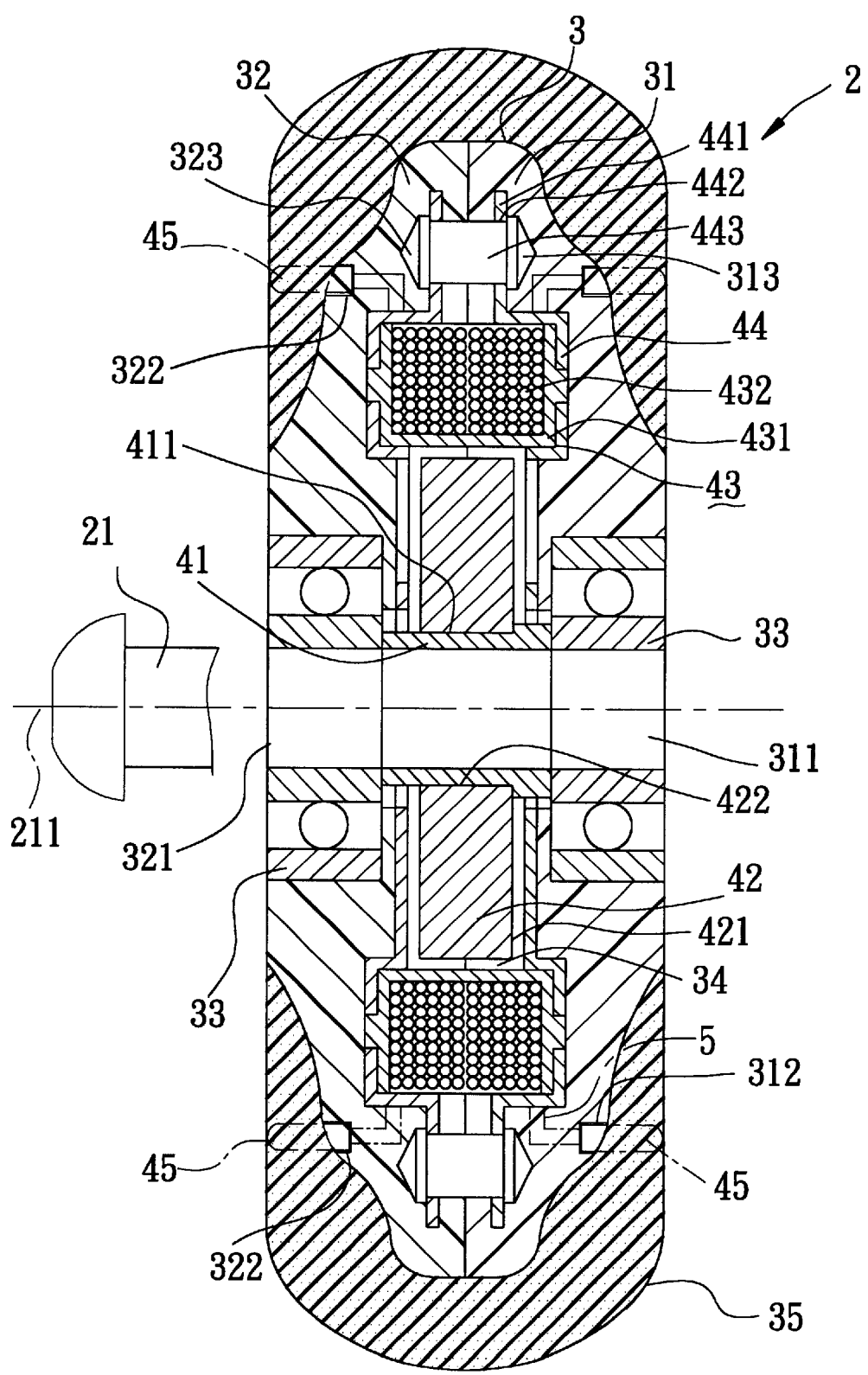
FIG. 4 is a sectional view of the preferred embodiment mounted on the roller shaft of the scooter.

Referring to FIGS. 3 and 4, the preferred embodiment of a roller 2 of the present invention is adapted to be mounted rotatably on a horizontal roller shaft 21 of a scooter (not shown), and is shown to include a roller housing 3, a light-permeable rim element 35, a light emitting unit 45, and an induction generator device 4.

As illustrated, the roller housing 3 includes two housing halves 31, 32, which are interconnected removably and which define an accommodation chamber 34 therebetween.

Each of the housing halves 31,32 has a shaft hole 311,321 and is adapted to be sleeved rotatably on the shaft 21 by means of bearing units 33 in such a manner that the shaft 21 extends through the shaft holes 311,321 in the housing halves 31,32 so that the housing 3 is rotatable about a horizontal axis 211 of the shaft 21.

The light-permeable rim element 35 is sleeved fixedly on the housing 3 so as to enclose the housing 3 within the rim element 35. In this embodiment, PU material is applied on the housing 3 by an injection-molding process so as to form the rim element 35 upon solidification thereof such that the rim element 35 rotates synchronously with the housing 3.

The light emitting unit 45 is disposed within the rim element 35. Preferably, the light emitting unit 45 includes two pairs of bulbs disposed in two pairs of diametrically disposed bores 312,322 that are formed in inner surfaces of the housing halves 31,32 such that illumination from the bulbs is visible from an exterior of the roller 2.

The induction generator device 4 is disposed within the accommodation chamber 34 of the housing 3, and includes a mounting tube 41, a permanent magnet 42, a winding unit 43, and two ring-shaped vertical electrically and magnetically conducting plates 44. The mounting tube 41 is adapted to be sleeved fixedly on the roller shaft 21 of the scooter, and extends between inner races of the bearing units 33. The permanent magnet 42 is shaped as a vertical ring plate that is sleeved non-rotatably on the mounting tube 41 and that has two opposite vertical side surfaces 421. The winding unit 43 is disposed in the accommodating chamber 34 of the housing 3, and includes a sheave 431 sleeved rotatably on the magnet 42,and a coil unit 432 that is wound on the sheave 431 and that is in electrical connection with the light emitting unit 45 via an electrical conductor 5, such as a wiring. The sheave 431 is further fixed to the roller housing 3 in a known manner. The conducting plates 44 are mounted fixedly in the housing 3, and are in electrical and coaxial connection with the coil unit 432. Each of the conducting plates 44 has an inner ring 443, an outer ring 444, and a plurality of elongated radially extending sheets 445 which are angularly spaced apart from each other and which have radial inner ends that are formed integrally with the inner ring 443, and radial outer ends that are formed integrally with the outer ring 444. The conducting plates 44 are further electrically connected with the permanent magnet 42 in a known manner. Under this condition, when the roller 2 rotates about the shaft 21, electricity is generated on the coil unit 432 so as to intermittently light up the light emitting unit 45, thereby emitting a flashing light from the roller 2 via the rim element 35.

Figure 1:
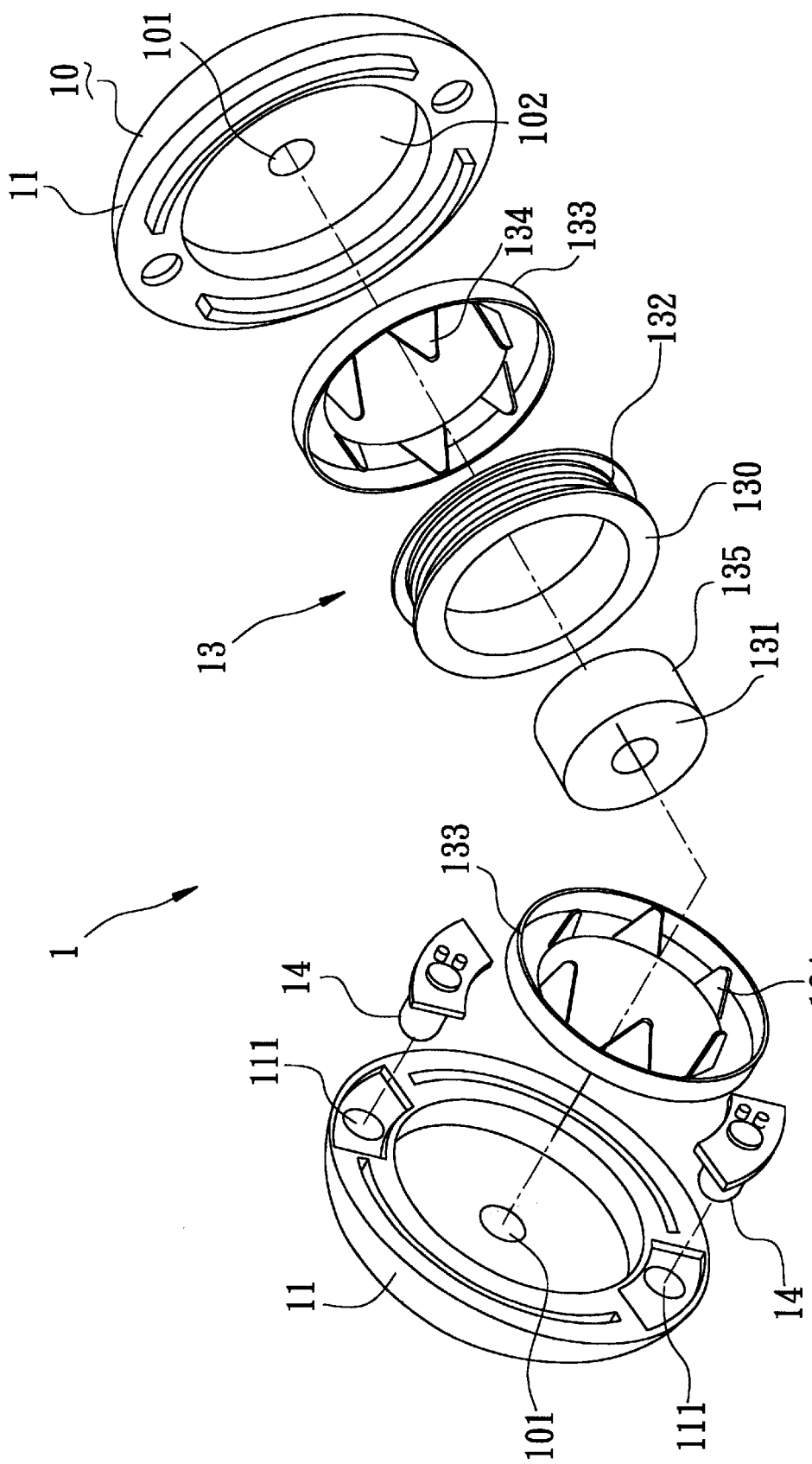
FIG. 1 is an exploded view of a conventional roller that is adapted to be mounted rotatably on a roller shaft of a scooter.
Figure 2:
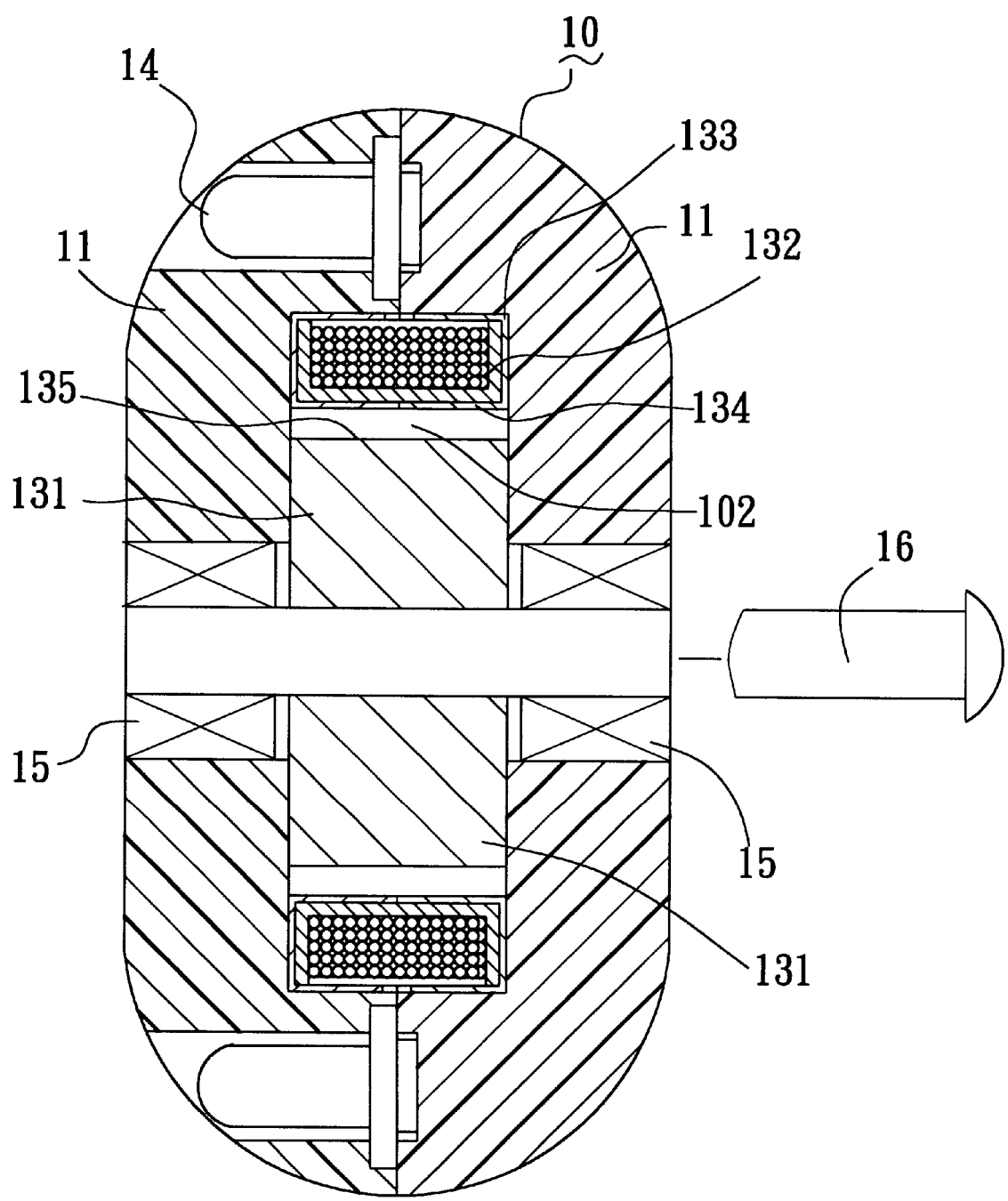
FIG. 2 is a sectional view of the conventional roller mounted on the roller shaft of the scooter.

In this preferred embodiment, the permanent magnet 42 is an anisotropic magnet manufactured from strontium-based iron oxide so that the magnetic field strength is increased. Because the sheets 445 are parallel and are disposed adjacent to the side surfaces 421 of the permanent magnet 42, magnetic lines of force passing through the sheets 445 are increased significantly as compared to those of the sheets 134 (see FIG. 1) of the conventional roller 1 (see FIG. 1), thereby resulting in an increased induced electromotive force. Preferably, the mounting tube 41 has two aligned flat outer surfaces 411. The anisoptropic magnet 42 has two flat inner surfaces 422 that abut respectively against the outer surfaces 411 of the mounting tube 41.

The conducting plates 44 have annular flanges 446 that extend integrally and axially from outer peripheries thereof toward each other. Each of the flanges 446 has two diametrically opposed lugs 441, each of which is formed with a pin hole 442 therethrough. The preferred embodiment further includes two pins 443, each of which extends through the holes 442 in an adjacent pair of the lugs 441 of the flanges 446 of the conducting plates 44 and into an adjacent pair of cavities 313,323 formed in inner surfaces of the housing halves 31,32, thereby connecting the conducting plates 44 fixedly to the housing 3.

With this invention thus explained, it is apparent that numerous modifications and variations can be made without departing from the scope and spirit of this invention. It is therefore intended that this invention be limited only as indicated in the appended claims.

I claim:

1. A roller adapted to be disposed rotatably on a horizontal roller shaft, said roller comprising:

a roller housing including two housing halves, which are interconnected removably and which define an accommodation chamber therebetween, each of said housing halves having a shaft hole and being adapted to be sleeved rotatably on the shaft in such a manner that the shaft extends through said shaft hole;

a light-permeable rim element sleeved fixedly on said housing;

a light emitting unit disposed within said rim element; and an induction generator device disposed within said accommodation chamber and including a mounting tube adapted to be sleeved fixedly on the shaft, a permanent magnet shaped as a vertical ring plate that is sleeved non-rotatably on said tube and that has two opposite vertical side surfaces, a winding unit including a sheave and a coil unit that is wound on said sheave and that is in electrical connection with said light emitting unit, said sheave being sleeved rotatably on said magnet and being fixed to said housing, and two ring-shaped vertical electrically and magnetically conducting plates mounted fixedly in said housing and in electrical and coaxial connection with said coil unit, each of said conducting plates having an inner ring, an outer ring, and a plurality of elongated radially extending sheets which are angularly spaced apart from each other and which have radial inner ends that are formed integrally with said inner ring, and radial outer ends that are formed integrally with said outer ring;

whereby, when said roller rotates about the shaft, electricity is generated on said coil unit so as to intermittently light up said light emitting unit, thereby emitting a flashing light from said roller via said rim element.

2. The roller as claimed in claim 1, wherein said magnet is an anisotropic magnet.

3. The roller as claimed in claim 1, wherein said tube has two aligned flat outer surfaces, said magnet having two flat inner surfaces that abut respectively against said outer surfaces of said tube.

4. The roller as claimed in claim 1, wherein said housing halves have inner surfaces that are formed with two adjacent pairs of cavities, said conducting plates having annular flanges that extend integrally and axially from outer peripheries thereof toward each other, each of said flanges having two diametrically opposed lugs, each of which is formed with a hole therethrough, said roller further including two pins, each of which extends through said holes in an adjacent pair of said lugs of said flanges and into an adjacent pair of said cavities in said housing halves, thereby connecting said conducting plates fixedly to said housing.

* * * * *